United States Patent Office 3,194,369
Patented July 13, 1965

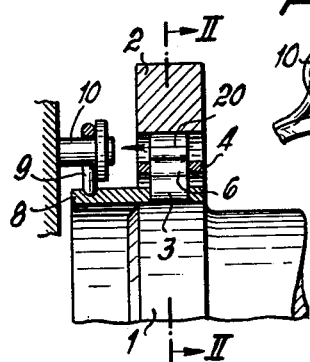
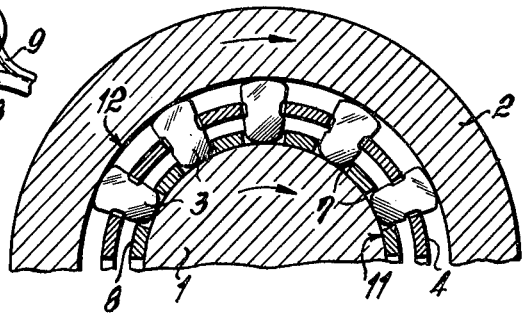
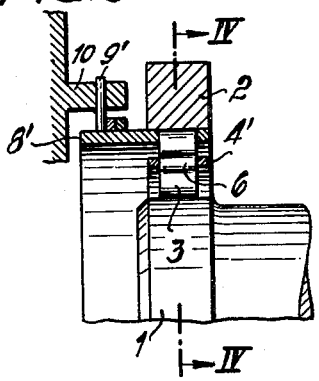
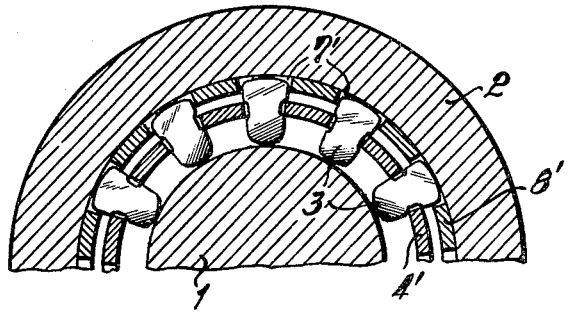
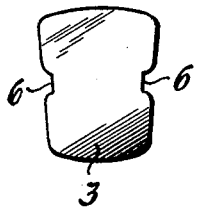
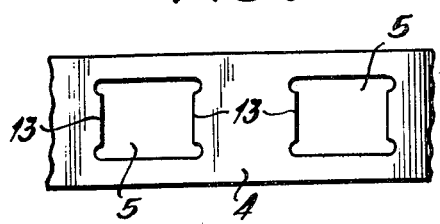

3,194,369
DOUBLE ACTING OVERRUNNING CLUTCH
Wolfgang Witte, Schweinfurt (Main), Germany, assignor to Fichtel & Sachs A.G., Schweinfurt (Main), Germany, a corporation of Germany
Filed May 17, 1963, Ser. No. 281,111
Claims priority, application Germany, May 18, 1962, F 36,836
13 Claims. (Cl. 192—45.1)

This invention relates to double-acting overrunning clutches, and more particularly to a double-acting overrunning clutch in which engagement between a driven clutch member and a driving clutch member is achieved by means of coupling elements which frictionally engage both clutch members when in a locking position, but permit free relative rotation of the clutch members when in an inoperative position.

The term "double acting overrunning clutch" as employed herein will be understood to designate a clutch adapted to transmit torque from a driven clutch member to a driving clutch member when the driven member rotates in either direction, but which cannot transmit driving torque from the driving member to the driven member, again regardless of the direction of rotation.

A primary object of this invention is the provision of a double-acting overrunning clutch which is relatively simple, and can be built at low cost.

Another object is the provision of such a clutch which may be assembled from simple component parts.

A further object is a clutch of the type described the functioning of which does not depend on maintenance of extremely precise dimensional tolerances in its component parts.

Yet another object is the provision of a double-acting overrunning clutch which operates automatically and without need of an external source of energy other than the torque transmitted by the clutch.

With these and other objects in view, the invention in one of its aspects consists in a clutch of the type described in which a driving clutch member and a driven clutch member are mounted on a support for rotation about a common axis. Respective annular faces of the clutch members about the common axis are radially spaced from each other.

Coupling members are interposed between the faces of the clutch members. Each coupling member is pivotable about a pivot axis parallel to the aforementioned common axis between an inoperative position in which the coupling member permits free rotation of the clutch members relative to each other about the common axis, and two locking positions which are angularly spaced from the inoperative position in opposite directions. When the coupling member is in its locking positions, it connects the clutch members for joint rotation in a respective direction.

Resilient means are provided for permanently urging the coupling members into engagement with the face of the driven clutch member. A control sleeve rotatable about the common axis of the clutch members is mounted on the support, and engages a portion of each coupling member spaced from the respective pivot axis. A brake mounted on the support engages the control sleeve and retards rotation thereof.

The exact nature of this invention as well as other features and advantages thereof will be readily apparent from consideration of the following specification relating to the annexed drawing in which:

FIG. 1 shows one half of a clutch of the invention in section on an axial plane;

FIG. 1a shows a detail of the clutch of FIG. 1, in an axial view taken in the direction of the arrow 20 in FIG. 1;

FIG. 2 is a radially sectional view of the clutch of FIG. 1 taken on the line II—II;

FIG. 3 shows a modification of the clutch of FIG. 1 in a corresponding view;

FIG. 4 shows the modified clutch of FIG. 3 in radial section on the line IV—IV;

FIG. 5 shows a detail of FIGS. 2 and 4 on an enlarged scale; and

FIG. 6 is a developed view of an annular cage also seen in FIGS. 1 to 4.

Referring now to the drawing in detail, and initially to FIGS. 1 and 2 there is seen a double acting overrunning clutch of the invention whose driving member is a shaft 1. The driven member of the clutch is a wheel 2. The shaft 1 and wheel 2 are mounted on a stationary support in the conventional manner, not further illustrated, for rotation about the common axis. The wheel 2 may be connected to a source of driving power in a manner not directly relevant to this invention, and the shaft 1 may be arranged to transmit the power of the source to a driven mechanism.

Twelve coupling elements 3, of which only five are seen in FIG. 2 are interposed between opposite annular cylindrical faces 11 and 12 of the shaft 1 and the wheel 2. As better seen in FIG. 5, the coupling elements have the approximate cross-sectional shape of an isosceles trapezoid with rounded corners and rounded base and top. The radius of curvature of the top and bottom of the coupling elements 3 is greater than one half of the height of the coupling element in a direction radial with respect to the common axis of the clutch members.

The coupling elements 3 are held in circumferentially spaced positions by an annular cage 4 of resilient material. A portion of the cage is illustrated in FIG. 6 in a developed view on a scale greater than that of FIGS. 1 and 2. Twelve apertures 5 in the annular cage 4 respectively receive the coupling elements 3. Lugs 13 projecting from axial edges into the apertures 5 engage grooves 6 in the sides of the coupling elements 3 and thereby secure each element to the cage for pivoting movement about an axis parallel to the common axis of the shaft 1, the wheel 2, and the cage 4.

The narrow top portions of the coupling elements 3 are received in approximately conforming openings 7 of a control sleeve 8 coaxial with the cage 4. The axial portion of the sleeve 8 in which the openings 7 are formed is coextensive with the faces 11, 12, and rotatably supported on the face 11. Another portion of the control sleeve 8 projects beyond the axial ends of the shaft 1 and the wheel 2 as best seen in FIG. 1.

A spring clip 9 is mounted on a pin 10 which is a portion of the stationary support referred to hereinabove, and not otherwise shown. As best seen in FIG. 1a, the two legs of the spring clip 9 engage a groove in the projecting axial portion of the control sleeve 8, and exert resilient braking pressure on the sleeve.

The aforedescribed apparatus operates as follows:

The dimensions of the resilient cage 4 in the relaxed condition are such that the cage 4 is under compressive stress when inserted with the coupling elements 3 between the faces 11 and 12 in the assembled condition of the clutch illustrated in FIGS. 1 and 2. The coupling elements are therefore resiliently urged by the cage 4 into frictional engagement with the face 12 of the wheel 2.

When the wheel 2 is rotated, the frictional drag of the spring clip 9 on the control sleeve 8 causes each coupling element to pivot about an axis parallel to the common axis of the clutch members. Because of the configuration of the coupling elements they assume a locking position in which they wedgingly connect the wheel 2 to the shaft 1 and cause the latter to rotate. Each coupling member being symmetrical with respect to an axial plane, the clutch is operative in either direction of rotation.

When the direction of rotation of the wheel 2 is reversed, the coupling elements 3 are pivoted by the control sleeve 8 through the inoperative position illustrated in FIG. 2 into the other locking position. The engagement of the clutch is instantaneously released while the coupling elements pass through the inoperative position.

If the shaft 1 rotates faster than the wheel 2, or if the wheel 2 stands still while the shaft 1 rotates, the combined effect of the radial forces exerted by the cage 4 and of the circumferential forces exerted by the control sleeve 8 causes the coupling elements 3 to assume the inoperative position in which no forces can be transmitted between the wheel 2 and the shaft 1. The shaft is free to rotate relative to the wheel.

The cage 4 preferably consists of a resilient plastic such as nylon. The several coupling elements 3 are mounted in the cage by inserting the narrower top of each element 3 in the aperture 5, and by wedgingly displacing the resilient lugs 13 when the coupling element 3 is pushed into the aperture 5 until the lugs 13 drop into the grooves 6 and thereby secure the coupling members in their working position. The resilience of the lugs 13 permits the pivoting movement of the coupling elements between locking and inoperative positions. The plastic annular cage 4 may be replaced by an annular steel member slotted to give it the desired resilience.

The control sleeve 8 should be of a material which is freely slidable on the material of the shaft 1. The friction between the control sleeve 8 and the annular face 11 must be smaller than the frictional braking force of the spring clip 9. If the shaft 1 consists of steel, most plastics are suitable materials for the sleeve 8. The sleeve may also be made of non-ferrous metal, and of steel if lubrication is provided.

The embodiment of the invention illustrated in FIGS. 3 and 4 differs from that described hereinabove in that the shaft 1 is the driven clutch member connected to a source of driving torque, whereas the wheel 2 is the driving clutch member. The coupling elements 3 are identical with those shown in FIG. 5, and the annular cage 4' appears identical with the cage 4 shown in FIG. 2 when in the assembled condition illustrated in FIG. 4. The dimensions of the annular cage 4' in the relaxed condition, however, are such that the cage is under tensional stress when assembled so that the coupling elements 3 are urged into engagement of their narrow tops with the shaft 1.

The wider bottoms of the coupling elements 3 engage approximately conforming openings 7' in a control sleeve 8' rotatable on the internal annular face 12 of the wheel 2. A portion of the sleeve 8' extends axially outward of the area of locking engagement between the coupling elements 3, the shaft 1, and the wheel 2. The projecting portion of the sleeve 8' is encircled by a spiral spring 9' one portion of which is attached to the stationary pin 10.

The mode of operation of the second embodiment of the invention is closely analogous to that described with reference to the apparatus of FIGS. 1 and 2. In normal driving operation the coupling elements 3 are pivoted about individual axes into a locking position by their simultaneous engagement with the shaft 1 under the radially acting force of the cage 4' and with the control sleeve 8' whose rotation is braked by the friction of the spiral spring 9'. When the shaft 1 stands still and the wheel 2 rotates, the control sleeve 8' also stands still, and the coupling elements 3 assume their inoperative position shown in FIG. 3. The wheel 2 freely rotates on the shaft 1.

The two embodiments of the overrunning clutch described hereinabove are simple and inexpensive to construct. The dimensional tolerances of the component parts are not overly critical, and are readily met. Engagement and disengagement of the clutch is automatically actuated in response to the movement of the clutch members relative to the stationary support on which they are rotatably mounted.

Obviously, many modifications and variations of the present invention are possible in the light of the above teachings. It is therefore to be understood that within the scope of the appended claims, the invention may be practiced otherwise than as specifically described.

What is claimed is:
1. In a clutch of the type described, in combination:
 (a) a support;
 (b) a driving clutch member;
 (c) a driven clutch member,
  (1) said clutch members being mounted on said support for rotation about a common axis, and
  (2) having respective annular faces about said axis, said faces being radially spaced from each other;
 (d) a plurality of coupling members interposed between said faces, each coupling member being pivotable about a pivot axis extending in the direction of said common axis between an inoperative position in which said coupling member permits free rotation of said clutch members relative to each other about said common axis, and two locking positions angularly spaced from said inoperative position in opposite directions, said coupling members when in said locking positions connecting said clutch members for joint rotation in a respective direction;
 (e) resilient means permanently urging each coupling member toward one of said faces and away from the other face;
 (f) control means mounted on said support for rotation about said common axis and engaging a portion of each coupling member spaced from the respective pivot axis for actuating movement of said coupling members between said positions thereof; and
 (g) brake means mounted on said support and engaging said control means for retarding said rotation of the control means.

2. In a clutch as set forth in claim 1, said resilient means including cage means pivotally engaging said coupling members and urging the same toward said one face.

3. In a clutch as set forth in claim 1, said resilient means including an annular cage member radially interposed between said faces, said cage member pivotally engaging each of said coupling members, and resiliently urging the same toward said one face.

4. In a clutch as set forth in claim 3, said cage member being formed with a plurality of apertures therein, said coupling members being respectively received in said apertures.

5. In a clutch as set forth in claim 4, each coupling member being formed with a groove, and said cage member pivotally engaging said groove.

6. In a clutch as set forth in claim 4, two resilient lugs projecting from said cage member into each of said apertures from opposite sides thereof, said coupling members each being formed with two grooves respectively receiving said lugs.

7. In a clutch as set forth in claim 1, said control means including a sleeve member coaxial with said faces, said sleeve member having an annular axial portion radially adjacent the other one of said faces, said annular portion being formed with recesses respectively receiving the respective portions of said coupling members spaced from the pivot axes thereof.

8. In a clutch as set forth in claim 7, said sleeve member having another axial annular portion spaced from said faces, said brake means engaging said other axial portion.

9. In a clutch as set forth in claim 8, said brake means including a spring member mounted on said support and frictionally engaging said other axial portion of said sleeve member.

10. In a clutch of the type described, in combination:
(a) a support;
(b) a driving clutch member;
(c) a driven clutch member, said clutch members being mounted on said support for rotation about a common axis and having respective annular faces about said axis, said faces being radially spaced from each other;
(d) a plurality of coupling members interposed between said faces, each coupling member being pivotable about a pivot axis extending in the direction of said common axis between an inoperative position in which said coupling member permits free rotation of said clutch members relative to each other about said common axis, and two locking positions angularly spaced from said inoperative position in opposite directions, said coupling members when in said locking positions connecting said clutch members for joint rotation in a respective direction;
(e) resilient means permanently urging said coupling members into engagement with one of said faces;
(f) a control sleeve member mounted on said support for rotation about said common axis, said control sleeve member having a first annular axial portion radially adjacent the other one of said faces and a second axial annular portion spaced from said faces, said first annular portion being formed with recesses respectively receiving respective portions of said coupling members spaced from the pivot axes thereof; and
(g) brake means including a spring member mounted on said support and frictionally engaging said second axial portion for retarding the rotation of the control sleeve member,
(1) said spring member being a two-legged clip, the legs of said clip engaging said second axial portion.

11. In a clutch of the type described, in combination:
(a) a support;
(b) a driving clutch member;
(c) a driven clutch member, said clutch members being mounted on said support for rotation about a common axis and having respective annular faces about said axis, said faces being radially spaced from each other;
(d) a plurality of coupling members interposed between said faces, each coupling member being pivotable about a pivot axis extending in the direction of said common axis between an inoperative position in which said coupling member permits free rotation of said clutch members relative to each other about said common axis, and two locking positions angularly spaced from said inoperative position in opposite directions, said coupling members when in said locking positions connecting said clutch members for joint rotation in a respective direction;
(e) resilient means permanently urging said coupling members into engagement with one of said faces;
(f) a control sleeve member mounted on said support for rotation about said common axis, said control sleeve member having a first annular axial portion radially adjacent the other one of said faces and a second axial annular portion spaced from said faces, said first annular portion being formed with recesses respectively receiving respective portions of said coupling members spaced from the pivot axes thereof; and
(g) brake means including a spring member mounted on said support and frictionally engaging said second axial portion for retarding the rotation of the control sleeve member,
(1) said spring member being a spiral spring having a terminal portion fastened to said support.

12. In a clutch as set forth in claim 7, said one clutch member being said driving member, and said other clutch member being said driven member.

13. In a double acting overrunning clutch, in combination:
(a) a support;
(b) a driving clutch member;
(c) a driven clutch member, said members being mounted on said support for rotation about a common axis and having respective radially spaced annular faces about said axis;
(d) an annular cage member interposed between said faces for rotation about said axis;
(e) an annular control member interposed between said cage member and one of said faces for rotation relative to said one face about said axis;
(f) a plurality of coupling members;
(g) securing means securing said coupling members to said cage member in angularly spaced relationship relative to said common axis for pivoting movement of each coupling member about a respective pivot axis extending in the direction of said common axis between an inoperative position and two locking positions angularly spaced from said inoperative position in opposite directions,
(1) said coupling members being shaped to permit free rotation of said clutch members relative to each other about said common axis when in said inoperative position,
(2) said coupling members when in said two locking positions wedgingly connecting said clutch members for joint rotation in a respective direction,
(3) said securing means including resilient means permanently urging said coupling members toward the other one of said faces and away from said one face;
(h) cooperating engagement means on said control member and on a portion of each coupling member spaced from the associated pivot axis in a direction toward said one face for pivoting said coupling members about the pivot axes thereof when said control member moves relative to said cage member about said common axis; and
(i) brake means mounted on said support and engaging said control member for retarding rotation thereof about said common axis.

References Cited by the Examiner
UNITED STATES PATENTS 2,028,876   1/36   Lotts ---------------- 192—45.1
2,910,159   10/59  Nielsen -------------- 192—45.1

FOREIGN PATENTS
30,670   4/04   Switzerland.

DAVID J. WILLIAMOWSKY, Primary Examiner.